United States Patent [19]

Merrill

[11] Patent Number: 4,555,788

[45] Date of Patent: Nov. 26, 1985

[54] MULTIPLE RATE BASEBAND RECEIVER

[75] Inventor: Dana A. Merrill, Raleigh, N.C.

[73] Assignee: ITT Corporation, New York, N.Y.

[21] Appl. No.: 583,085

[22] Filed: Feb. 23, 1984

[51] Int. Cl.[4] .............................................. H04B 3/14
[52] U.S. Cl. ....................................... 375/11; 333/18; 370/84
[58] Field of Search ....................... 375/11, 12, 13, 14; 333/18, 28 R; 364/724; 370/84, 85

[56] References Cited

U.S. PATENT DOCUMENTS 2,805,398  9/1957  Albersheim ........................... 375/11
3,624,539  11/1971 Kao ....................................... 333/18
3,649,916  3/1972  Winters ................................. 375/12
3,763,359  10/1973 Cho et al. ............................. 375/14

Primary Examiner—Benedict V. Safourek
Assistant Examiner—Stephen Chin
Attorney, Agent, or Firm—John T. O'Halloran; Jeffrey P. Morris

[57] ABSTRACT

The present invention consists of a multirate data receiver which will recover data at any of N data rates with no predetermined restrictions on the value of N. The data rate at which the receiver operates is selected by a single 1-of-N switch selection. An equalizer section is constructed for each of the N data rates but are all controlled by the same (common) automatic adjustment circuitry, which controls gain and frequency compensation. The output from one of the equalizer sections is selected by an analog multiplexer constructed of field effect transistor (FET) switch circuits. The recovered waveforms from the equalizer sections are processed by common circuitry to recover the transmitted data. Clock recovery may be accomplished, for example, by a digital phase locked loop constructed such that the characteristics of the loop filters and divide-by-M feedback counters are easily modified by logical signals controlled by the 1-of-N switches.

10 Claims, 2 Drawing Figures

MULTIRATE RECEIVER BLOCK DIAGRAM

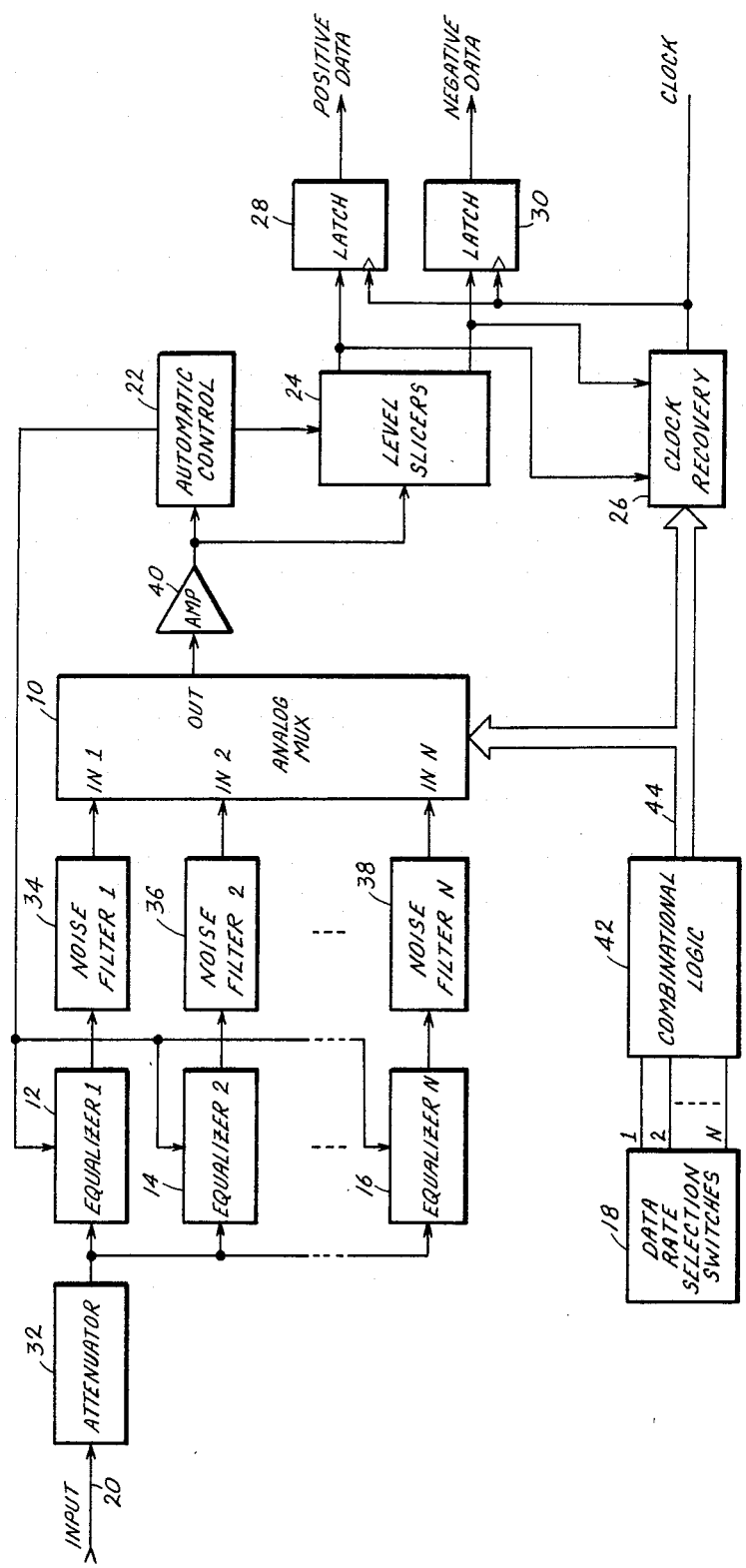

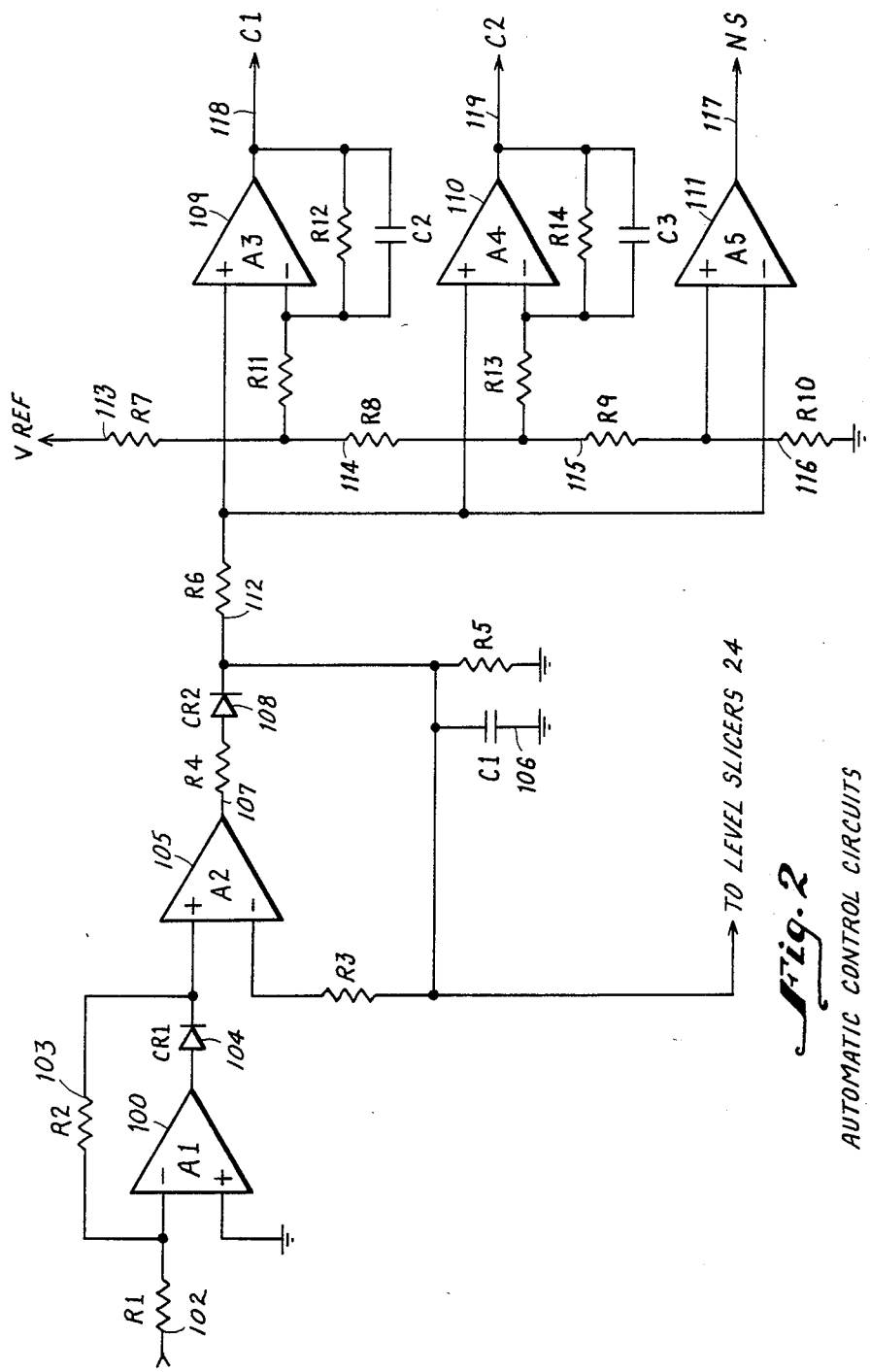
Fig. 2 AUTOMATIC CONTROL CIRCUITS

MULTIPLE RATE BASEBAND RECEIVER

CROSS REFERENCE TO RELATED APPLICATION

U.S. patent application Ser. No. 583,084 of D. A. Merrill-2, Multiple Rate Baseband Transmitter, filed on even date herewith.

BACKGROUND OF THE INVENTION

1. Field of the Invention

The present invention relates to multiple data rate baseband receivers which are used to detect the presence of, and to recover bipolar or alternate mark inversion (AMI) data and timing information from a transmission medium such as a transmission cable. The cable may be of short or long length and the data may be transmitted at a plurality of data rates.

2. Description of the Prior Art

In digital data telephone transmission systems there are a plurality of different data rates commonly used for data transmission. For example, in the dataphone digital system of ATT there are four different data rates used, i.e., 2400 baud, 4800 baud, 9600 baud and 56,000 baud. Alternate mark inversion (AMI) data is transmitted over existing voice grade telephone wires between a telephone central office and the subscribers. In systems of the prior art, separate receivers or at least separate circuitry are typically required for each data rate transmitted, particularly with respect to equalization.

Baseband receivers require some form of equalization to compensate for distortion in the transmitted signal by the transmission cable. Clock recovery circuitry is also required to recover timing information from incoming data. Additionally, no signal detection is used to detect the absence of an incoming data signal.

The equalization required to recover the transmitted data varies with cable length, type and environmental surroundings. To eliminate an infinite number of equalizer designs and/or adjustments, the equalization is typically adjusted partially or completely automatically by receiver control circuits based on incoming signal amplitude and knowledge of the transmission cable characteristics, data rate and the transmitted pulse amplitude.

Timing information is typically recovered in the prior art by a tank circuit which is excited by transistions in the incoming data or by a phase locked loop circuit which will lock with the proper phase relationship to the incoming data.

No signal detection is typically accomplished in the prior art by monitoring the automatic equalizer control circuitry and detecting an attempt to recover a signal which is smaller than that which is possible based on knowledge of transmitted pulse amplitude and maximum cable attenuation limits. An alternate method of no signal detection is to detect that the tank circuit used for clock recovery is not ringing which indicates that insufficient energy at the data rate is coming into the receiver and therefore no data signal is present.

These prior art techniques for data recovery are based on a given data rate. The equalizers are designed for data signals over a narrow frequency range and will not properly compensate for significantly differing data rates. The clock recovery techniques are also suited only for a specific data rate due to the operation of the tank circuits or phase locked loop filters and dividers.

SUMMARY OF THE INVENTION

The present invention consists of a multirate data receiver which will recover data at any of N data rates with no predetermined restrictions on the value of N. The data rate at which the receiver operates is selected by a single 1-of-N switch selection. An equalizer section is constructed for each of the N data rates but are all controlled by the same (common) automatic adjustment circuitry, which controls gain and frequency compensation. The output from one of the equalizer sections is selected by an analog multiplexer constructed of field effect transistor (FET) switch circuits. The recovered waveforms from the equalizer sections are processed by common circuitry to recover the transmitted data. Clock recovery may be accomplished, for example, by a digital phase locked loop constructed such that the characteristics of the loop filters and divide-by-M feedback counters are easily modified by logical signals controlled by the 1-of-N switches.

BRIEF DESCRIPTION OF THE DRAWINGS

FIG. 1 is a block diagram of a multi-rate baseband receiver in accordance with the present invention.

FIG. 2 is an automatic control circuit for use in the receiver described with reference to FIG. 1.

DESCRIPTION OF THE PREFERRED EMBODIMENT

Referring now to FIG. 1, the multiple data rate receiver of the present invention is shown in block diagram form. An analog multiplexer 10 selects one of the N equalizers illustratively shown at 12, 14 and 16 depending on the bipolar data rate determined by the data rate selection switches 1 through N shown illustratively at 18. The equalized received signal on line 20, which consists of bipolar or AMI data represented by logical $+1$, $-1$ and 0 information is processed by common circuitry for automatic gain and frequency control at automatic control circuit 22, which is described in detail with reference to FIG. 2. Level slicing, clock recovery and data sampling (clocked latch) are performed respectively at level slicing circuitry 24, clock recovery circuit 26 and latches 28 and 30, with latch 28 having a positive data output and latch 30 having a negative data output.

The attenuator 32 is used to attenuate the incoming signal on line 20, which may originate at the multirate baseband transmitter described in the cross-referenced application, to a level suitable for input to the equalizers 1 through N as explained hereinafter. Each individual equalizer functions in well known manner to increase gain with frequency to match the inverse of the input signal response so that a flat gain response with frequency is obtained. The attenuator function is preferably implemented by a resistive divider network.

An equalizer section is used for each data rate. The equalizer preferably consists of two equalizer sections in series. The first section of the equalizer is capable of compensating for the distortion introduced by shorter transmission cables. The second equalizer section along with the first equalizer section compensates for longer cable lengths. The two equalizer sections are controlled by the control circuits such that the first equalizer section is turned fully on (compensating for its maximum cable length) before the second equalizer section is turned on. The variable component in the equalizer sections are preferably field effect transistors which are used as voltage variable resistors. The voltage across the FET is held to a small value to obtain linear operation, thus the requirement for the attenuator 32 is important.

Each input data rate requires a different noise filter to limit the noise power introduced into the receiver. The noise filters are low pass filters. This allows accurate data recovery with minimum signal-to-noise ratios at the input of the receiver. The noise filter is included in the signal path following each equalizer 1 through N before the equalized and noised filtered input signal is coupled to the analog multiplexer 10. The noise filters are illustrated by N noise filters corresponding to N equalizers and N data rates, and are shown illustratively as noise filters 34, 36 and 38.

The output of each noise filter 1 through N is input to the analog multiplexer 10, preferably comprised of FET or CMOS switches. The multiplexer 10 has N inputs and 1 output. The multiplexer 10 selects data from the equalizer corresponding to the data rate that has been selected by the data rate selection switches and inputs the selected data to the common circuits 22 through 30 of the receiver, which are used for all input data rates.

The amplifier 40 which has the output of the analog multiplexer 10 coupled to the input thereof compensates for the input attenuator and is AC coupled to block DC components from the equalizers 1 through N.

The output of the amplifier 40 is coupled both to the automatic control circuitry 22 and to the level slicer circuitry 24 for recovery of data pulses. The level slicers 24 use the peak value of the recovered signal, which information is produced by the automatic control circuits as described with reference to FIG. 2, to set decision thresholds to determine the presence of positive and negative pulses. The threshold is produced by a resistor divider from the peak value signal and is fed into the input of comparators which monitor the recovered signal from the amplifier 40 to produce pulses at one output of level slicer 24 corresponding to positive received pulses and pulses at another output corresponding to negative received pulses.

These received data pulses are sent to the clock recovery circuit 26 which is comprised of a digital phase locked loop. The digital phase locked loop circuit of clock recovery circuit 26 locks its output clock 90 degrees out of phase to the incoming data pulses. The rising edge of the recovered clock produced by the digital phase locked loop will occur in the center of the received data pulses. The characteristics of the digital phase locked loop including lock time, jitter attenuation, lock range and output frequency are controlled according to the data rate selected by the data rate selection switches 18. This recovered clock is used to clock the data latches 28 and 30, which are flip-flops, which will latch the data from the level slicers 24 producing complete data recovery.

The data rate selection switches 1 through N at 18 produce inputs to a combinational logic circuit 42 of conventional design which decodes the switch outputs and produces output control signals on data bus 44 to control the analog multiplexer 10 and the clock recovery circuit 26.

The automatic control circuit 22 is shown schematically in FIG. 2. Amplifier A1 at 100, resistors R1 and R2 at 102 and 103, and diode CR1 at 104 make up an absolute value circuit which presents the absolute value of the input signal from the amplifier 40 to the non-inverting input of amplifier A2 at 105. Amplifier A2 and diode CR2 form an ideal diode circuit which buffers the absolute value signal and charges capacitor C1 at 106 to the peak value of the input signal to the control circuitry 22. Resistor R4 at 107 is inclined in series with diode CR2 at 108 to limit the rate at which capacitor C1 can charge while resistor R5 at 109 controls the rate at which capacitor C1 can discharge when the input signal decreases in amplitude. Resistor R3 protects amplifier A2 in power down conditions. The peak value of the equalized signal, which is the voltage on capacitor C1, is fed to the inputs of the amplifiers A3, A4 and A5 at 109, 110 and 111 respectively, and is used by the level slicer circuit 24 as aforementioned. Resistor R6 at 112 protects amplifiers A3, A4 and A5 during power down conditions. Resistors R7, R8, R9 and R10 at 113, 114, 115 and 116 respectively, form a divider network to generate a reference for amplifiers A3, A4 and A5.

Where there is no input signal coupled to the receiver, no signal will be present at the input of amplifier A2. Therefore, capacitor C1 will discharge such that the inputs to amplifiers A3, A4 and A5 from capacitor C1 is below the reference voltage for each of said amplifiers. This condition results in a high output from amplifier A5 on line 117 indicating no signal (NS) and a low output from each of amplifiers A3 and A4 on lines 118 and 119 respectively. The output signals from amplifiers A3 and A4 shown as control signals C1 and C2 on lines 118 and 119 respectively control the two equalizer sections for each equalizer described with reference to FIG. 1. The control signals C1 and C2 are common to all equalizer pairs 1 through N and are coupled thereto as control inputs. A low output for control signals C1 and C2 causes the equalizers to compensate for maximum cable length. If a signal is input to the receiver, the voltage on capacitor C1 is indicative of the peak value of the equalized signal. When less than maximum cable length is present, the voltage on capacitor C1 will be above the reference input to amplifier A5 causing the output of amplifier A5 to switch low indicating the presence of an incoming signal. Resistors R8 and R9 are of low resistance value such that the difference in the reference inputs to amplifier A4 and A5 is slightly greater than the value of that when amplified by the control amplifiers will cause the control signals to swing from maximum levels to minimum levels. As the voltage on capacitor C1 continues to rise, the output level of amplifier A4 will rise, gradually turning off the second stage of each equalizer. If the cable is short enough, the voltage on capacitor C1 will cease to increase when the desired setting on the equalizers has been reached and the amplitude of the recovered signal will stabilize at the value determined by the reference divider. It is also to be noted that the aforedescribed technique for equalizer control may be extended by any number of equalizer sections by adding resistors to the reference divider and by adding control amplifier sections.

I claim:
1. A baseband receiver for receiving bipolar data having positive and negative data pulses at a plurality of data rates, comprising:
 a plurality of equalizer means 1−N for equalizing input bipolar data at a plurality of data rates 1−N;
 means for selectively coupling said input bipolar data at a plurality of input data rates to a selected one of said equalizer means;
 multiplexing means for selecting data from the selected equalizer means, and having an output;

automatic control means common to said equalizing means having the output of said multiplexing means coupled thereto, for providing a feedback adjustment for said equalizer means; and level slicing means responsive to said selected equalizing means for receiving positive and negative data pulses from the received data in response to decision thresholds.

2. A baseband receiver in accordance with claim 1 further including:

data rate selections means for selecting a particular input data rate at which the receiver is to operate, and including means for coupling a logical signal indicative of the selected data rate to the multiplexing means.

3. A baseband receiver in accordance with claim 1, further including:

attenuation means for attenuating the input bipolar data prior to coupling said data to the equalizer means.

4. A baseband receiver in accordance with claim 1, further including:

filter means for low pass filtering to the output of each of said 1−N equalizer means such that the equalizer outputs are noise filtered before being coupled to the multiplexer means.

5. A baseband receiver in accordance with claim 3 further including:

amplifier means coupled to the output of said multiplexing means for providing compensation for said attenuation means.

6. A baseband receiver in accordance with claim 1 wherein said level slicing means is arranged to use the peak value of the recovered data to set said decision thresholds to determine the presence of positive and negative data pulses.

7. A baseband receiver in accordance with claim 1, further including:

clock recovery means responsive to the output of said level slicing means and to the output of said data selection means for clocking data at the selected data rate.

8. A baseband receiver in accordance with claim 7, further including:

latching means clocked by said clock recovery means for latching the positive and negative data pulses from said level slicing means, whereby complete data recovery is obtained.

9. A baseband receiver in accordance with claim 1, wherein said automatic control means includes:

means for deriving a plurality of control signals, each coupled to each equalizer means for providing compensation for a plurality of transmission line conditions.

10. A baseband receiver in accordance with claim 9, wherein each equalizer is comprised of a plurality of sections, each section being adjustable in accordance with one of said plurality of control signals.

* * * * *